United States Patent [19]

Iida et al.

[11] 4,031,781

[45] June 28, 1977

[54] SPEED REDUCTION GEAR

[75] Inventors: Yoshihisa Iida, Kyoto; Yozo Oike, Osaka, both of Japan

[73] Assignee: Shinpo Kogyo Kabushiki Kaisha, Kyoto, Japan

[22] Filed: Dec. 15, 1975

[21] Appl. No.: 640,944

[30] Foreign Application Priority Data

Dec. 16, 1974 Japan .......................... 49-144220
Sept. 9, 1975 Japan .......................... 50-109329

[52] U.S. Cl. .................................. 74/804; 74/413
[51] Int. Cl.² ............... F16H 1/06; F16H 1/20; F16H 1/28
[58] Field of Search .......................... 74/413, 804

[56] References Cited

UNITED STATES PATENTS

| 3,073,184 | 1/1963 | Braren | 74/804 |
| 3,668,947 | 6/1972 | Waldorff | 74/804 |
| 3,910,733 | 10/1975 | Grove | 74/804 X |

*Primary Examiner*—Leonard H. Gerin
*Attorney, Agent, or Firm*—Pierce, Scheffler & Parker

[57] ABSTRACT

A speed reduction gear of the differential type comprises a stationary internal gear with teeth of circular convex profile and an external gear with teeth of circular concave profile, the meshing between the profiles occurring preferably in a "concave to convex" state and in which the meshing point moves reciprocally on the concave profile of the teeth of the external gear. In this speed reduction gear, noise is decreased in a large amount by supporting the teeth of the internal gear at their ends relieving intermediate portions of them.

2 Claims, 14 Drawing Figures

SPEED REDUCTION GEAR

A well known type of speed reduction gear is one wherein a stationary internal gear and an external gear meshing with the internal gear are provided so as to effect a differential rotation of an output shaft due to the difference in the number of teeth of these gears. This type of speed reduction gear is one which is capable of obtaining a relatively large speed reduction ratio under a simple construction, but it is accompanied with a problem about "interference of gear teeth" and a problem about "strength of gear teeth" when it is required to reduce its size in comparison with its capacity. The former is caused by a fact that, in the case of ordinary gears, it is hard to reduce the difference in the number of teeth between the internal and external gears of small size without an occurrence of interference.

For the above reason, there has been developed a type of speed change gear in which an internal gear with teeth of circular profile is used. In the case of this type of speed reduction gear, there is used an external gear with teeth the profile of which is generated by the circular profile of the teeth of the internal gear. As the height of the generated profile of the teeth of the external gear is low, and further, as the teeth of the internal and external gear mesh mutually in a state of "concave to convex", in the case of this type of speed reduction gear, a special material which is able to bear against an extremely high contact pressure is used for the production of the gears. The cost of equipment for the production of the special external gear, and the use of the special material, make the price of this type of speed reduction gear expensive.

One object of the present invention is to provide a speed reduction gear of differential type which is capable of being produced at a low cost.

Another object of the present invention is to provide a speed reduction gear of differential type in which use of special materials is not required for the production of gears.

Other objects and advantages of the present invention will be apparent from the following description, taken in connection with the accompanying drawings, in which.

Figure 1:
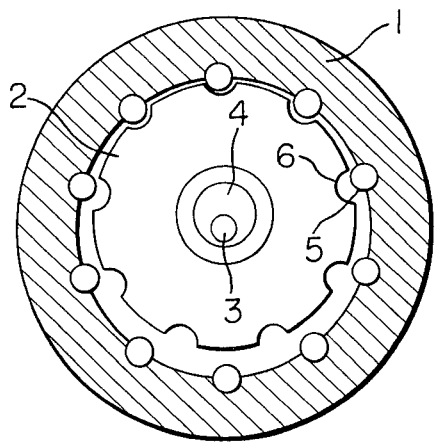
FIG. 1 is a cross-sectional view showing a speed reduction gear according to the present invention.
Figure 2:
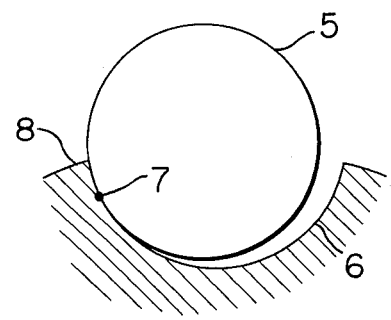
FIG. 2 is a partial enlarged view of FIG. 1.

Referring to FIG. 1, the speed reduction gear is provided with a stationary internal gear 1 and an external gear 2 meshing with the internal gear 1. The external gear 2 rotatively engages with an eccentric disc 4 provided on an input shaft 3 so as to be given an eccentric motion following the rotation of the input shaft 3. A plurality of holes necessary for the transmission of the spin of the external gear 2, a plurality of pins each of which engages with the surface of the above said hole and the carrier of the above said pins are not shown, as they are well known members for the speed reduction gear including the above-mentioned internal and external gears 1, 2.

Both the internal gear 1 and the external gear 2 are provided with teeth of circular profile. The circular profile 5 of the teeth of the internal gear 1 is convex, while the circular profile 6 of the teeth of the external gear 2 is concave. The radius of curvature of the concave profile 6 is larger than that of the convex profile 5, and engaging point 7 (i.e. the meshing point) does not come to the edge 8 of the concave profile 6. The meshing point 7 is not a definite point, and it moves reciprocally within a definite range.

FIGS. 3 to 6 are figures explaining the movement of the meshing point 7 diagrammatically. In these figures, 8a shows an edge 8 of the concave profile 6 which is on the leading side of rotation of the external gear 2. Further, 7a and 7b show stroke-ends of reciprocal movement of the meshing point 7. The meshing point 7a is one which is nearest to the edge 8a of the concave profile 2, and the meshing point 7b is one which is mostly remote from the edge 8a of the concave profile 2. The distance between the edge 8a and the meshing point 7a is relatively small but it is not zero. The circular pitch of the teeth of the internal gear 1 and that of the external gear 2 are shown by notations $p_1$ and $p_2$, respectively. The meshing point 7 moves from 7a to 7b and then moves back from 7b to 7a.

Figure 3:
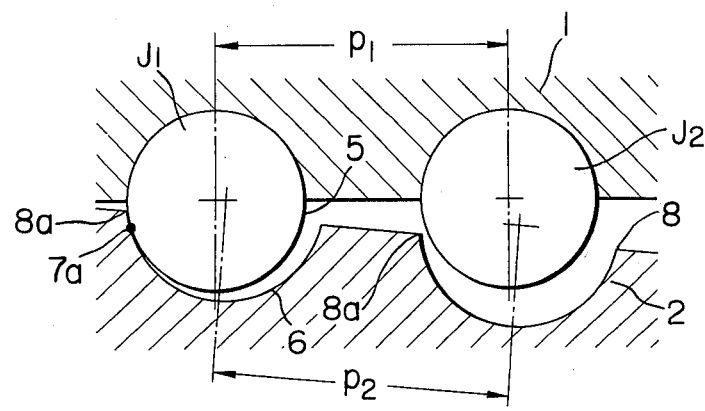
FIG. 3 to FIG. 6 are views showing successive states which will occur following the rotation of the input shaft of the speed reduction gear shown in FIG. 1.
Figure 4:
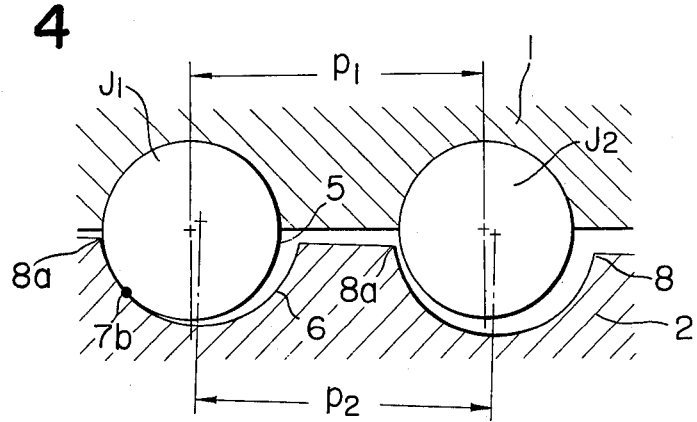
Figure 5:
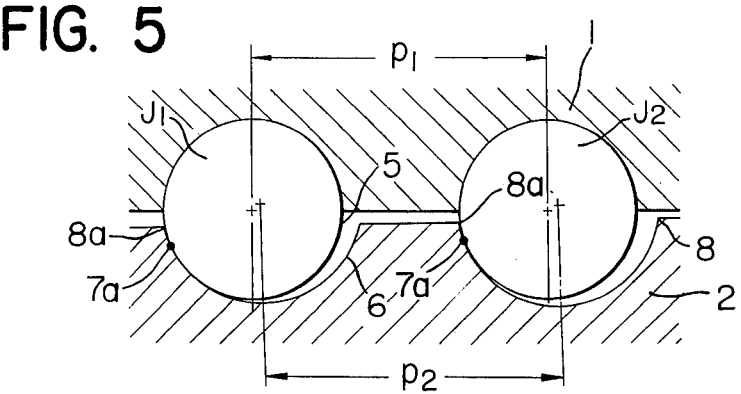
Figure 6:
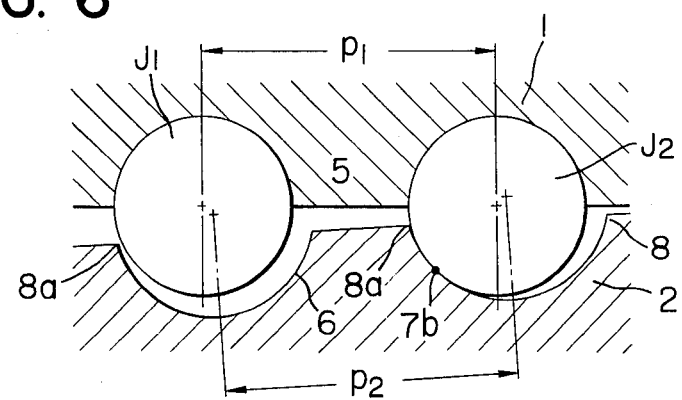

A tooth $J_1$ of internal gear 1 comes to mesh with the concave profile 6 of external gear 2 as shown in FIG. 3. The meshing state of tooth $J_1$ continues until the relation between tooth $J_1$ and the concave profile comes to a state shown in FIG. 5. The state shown in FIG. 4 is an intermediate state wherein the meshing point is at 7b. In the state shown in FIG. 5, as a tooth $J_2$ provided next to the tooth $J_1$ comes to mesh with the concave profile 6 of external gear 2, the proceeding tooth $J_1$ becomes free from the concave profile 6 after the state shown in FIG. 5. FIG. 6 shows a state wherein tooth $J_2$ meshes with the concave profile at 7b, and this state corresponds to the state shown in FIG. 4.

The internal gear 1 and the external gear 2 can be obtained by a design which includes four steps.

The first step mentioned below is one which is adopted for a known type of speed reduction gear shown in FIG. 7. In the case of this speed reduction gear, there are provided also an internal gear with teeth of circular convex profile and an external gear with teeth of circular concave profile, but the radius $l_o$ of the convex profile is equal to the radius $L_o$ of the concave profile.

The concave profile meshes with the convex profile at its one edge. This is caused by a fact that one circular profile which coincides with the other circular profile cannot leave from the other profile keeping a contact at any middle point. This type of the speed reduction gear is unpractical as the edge-drive causes high concentration of contact pressure, but the method for the determination of dimensions of various parts can be utilized as the first step for the design of the internal gear 1 and the external gear 2.

FIRST STEP

Figure 7:
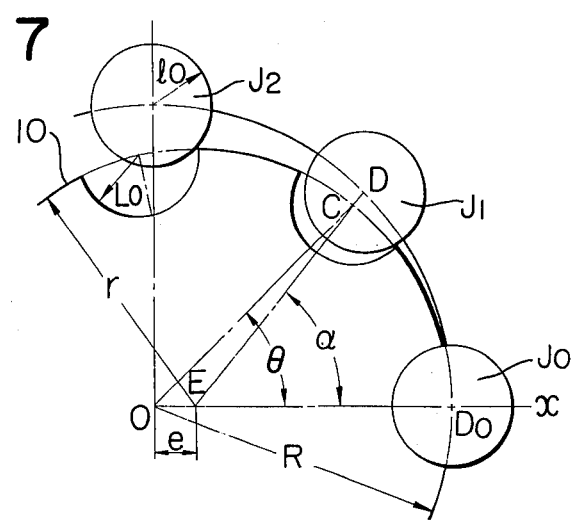
FIG. 7 to FIG. 11 are views explaining one preferable process for the design of the speed reduction gear according to the present invention.

FIG. 7 is a drawing explaining this step. In this figure, three teeth $J_0$, $J_1$, $J_2$ of the internal gear as shown. Among these teeth, tooth $J_0$ is one, the center $D_0$ of which is on a line passing through the center 0 of the internal gear and the center E of the external gear. $J_1$ is a tooth which is provided next to the tooth $J_o$, and $J_2$ is a tooth which is provided next to the tooth $J_1$.

The first step is one for determining the radius R of the pitch circle 9 of internal gear, the radius $r$ of the pitch circle 10 of the external gear, the eccentricity $e$ of the eccentric motion of the external gear and the maximum radius $l_o$ of the circular convex profile for the speed reduction gear wherein the radius of convex profile is equal to that of the concave profile. The point D is the center of tooth $J_1$ and $\theta$ ($<D_oOD$) is equal to "360°/(number of teeth of internal gear)". The point C is the cross-point between the radius OD and the pitch circle 10.

The point E is one which is determined by the following equation:

$<CED_o=360°$/number of teeth of the external gear. Apparently, the point E gives the center of the external gear, and the distance OE offers eccentricity of the external gear. The drawing for the determination of the point E is carried out so that an interference by tooth $J_1$ does not occur. And, by a simple calculation about the triangle OEC, the following equation can be derived:

$$r = R \frac{\sin \theta}{\sin \theta + \sin (\alpha - \theta)}$$

Further, the maximum value of $l_o$ is calculated by the following equation:

$$l_o = 2r \sin(\alpha - \theta)$$

This equation is derived from a condition that the tooth $J_2$ does not interfere with the concave profile.

SECOND STEP

Figure 8:
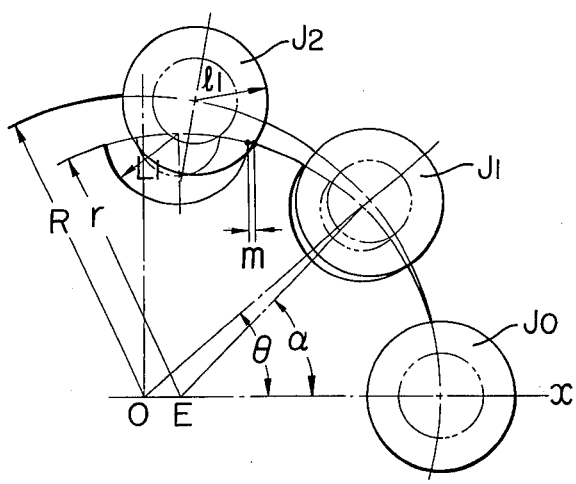

FIG. 8 shows the second step which includes the following processes:

a: At first, the radius $l_o$ of the convex profile is increased to $l_1$ so that the teeth of the internal gear come to have a required strength. And, at the same time, the radius $L_o(l_o=L_o)$ of the concave profile is increased to $L_1(L_1=l_1)$. By this process, the tooth comes to interfere with the concave profile.

b: An amount of interference $m$ in the direction $x$ (direction of the line $OD_o$) is calculated.

THIRD STEP

Figure 9:
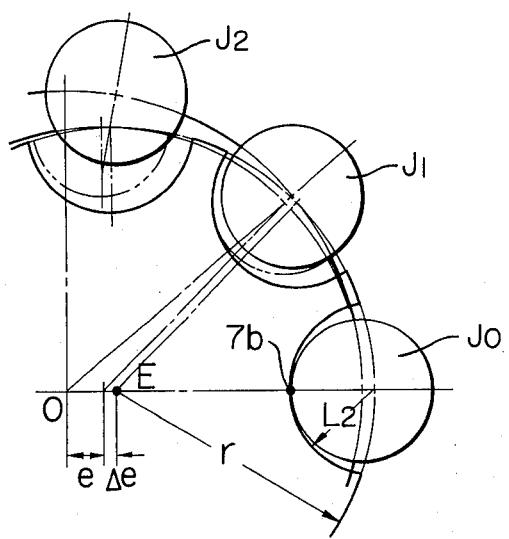

FIG. 9 shows the third step which includes the following processes:

a: The amount of eccentricity is increased from $e$ to $e + \Delta e$. $\Delta e$ is an amount which is a little larger than the above amount $m$. The tooth $J_o$ comes to interfere with the concave profile by this process.

b: The radius of the concave profile is increased from $L_1$ to $L_2$ so that the tooth $J_o$ does not interfere with the concave profile.

The meshing point between tooth $J_o$ and the concave profile corresponds to that shown in FIG. 4 by the notation 7b. For this reason the same notation 7b is used also for the case of this meshing point. In the state shown in FIG. 9, the meshing point 7b is on the bottom of the concave profile, and it is disadvantageous for the transmission of torque. The following fourth step is one for avoiding this disadvantage.

FOURTH STEP

Figure 10:
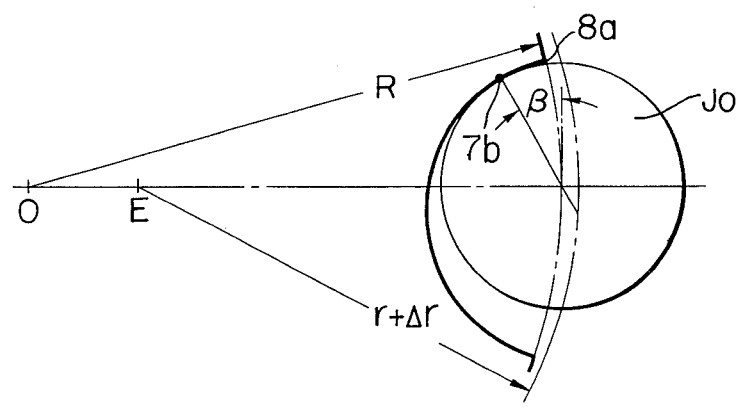

FIG. 10 shows the fourth step. This step is that for shifting the meshing point 7b towards the edge 8a of the concave profile by increasing the radius of pitch circle of the external gear from $r$ to $r+\Delta r$. The degree of shifting of the meshing point 7b is shown by an angle $\beta$. The shifting of the meshing point 7b, that is to say, the increasing of the radius $r$, must be expected so that the meshing point 7a (explained referring to FIG. 3– FIG. 6) does not come to the edge 8a of the concave profile.

Figure 11:
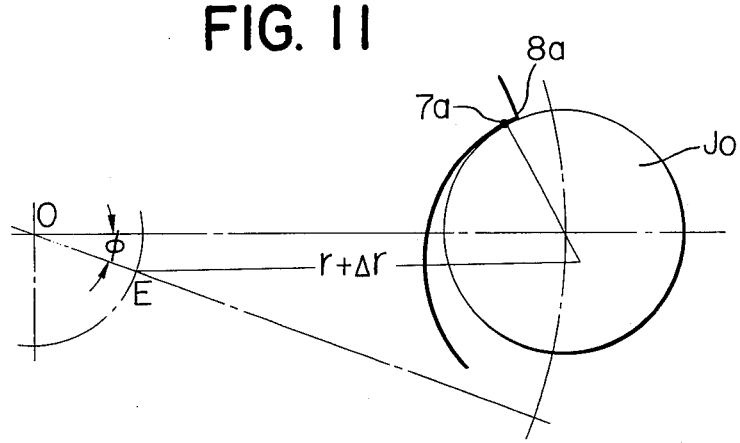

A tooth next to the tooth $J_o$ comes to mesh with the concave profile when the external gear is rotated by an angle $\phi$, and after this instance the tooth $J_o$ leaves the concave profile. FIG. 11 shows the above angle $\phi$ together with the meshing point 7a.

The above-explained four steps makes it possible to design the speed reduction gear easily, but this speed reduction gear can be designed by other combinations of step which will derive the same result.

The above-explained speed reduction gear can be produced at low cost. Further, it is produced so as to have a sufficiently high durability, because the gears used in this speed reduction gear mesh with each other in a state of "convex to concave" which decreases contact pressure enormously. In the case of the speed reduction gear in which the gear with generated tooth-profile, the gears mesh with each other in a state of "convex to convex" and the above contact pressure exceeds four times in comparison with that of the case of "convex to concave".

Figure 12:
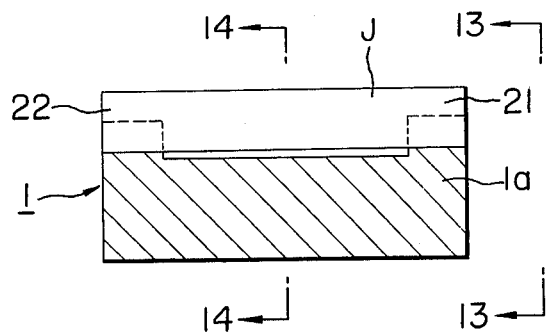
FIG. 12 is a view explaining an improved support of teeth of the internal gear in the case of the speed reduction gear according to the present invention.
Figure 13:
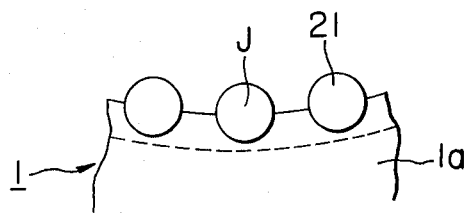
FIG. 13 and FIG. 14 are views taken in the directions of 13 — 13 and 14 — 14 in FIG. 12, respectively.
Figure 14:
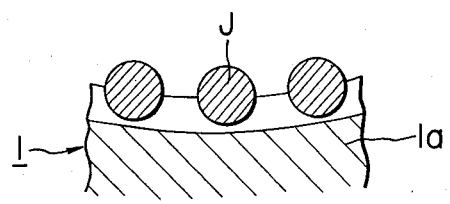

In the case of the speed reduction gear, the peak of the contact pressure can be decreased further by supporting the teeth J as shown in FIGS. 12 to 14. The internal gear 1 is composed of a portion of casing 1a and a train of pins J, and these pins as teeth J are supported at their ends 21, 22 by the casing 1a. The maximum amount of deflection is an order of only one micron, but merit due to this small deflection is very large, and it decreases the peak value of the contact pressure effectively. The above support of the teeth J decreases the noise remarkably. This decrease of noise is in an order of 11 horns (for example, the noise is decreased from 78 horns to 68 horns.). As the problem noise is a serious one for this type of speed reduction gear, the above decrease of noise can be mentioned rather as the biggest merit of the above support.

What is claimed is:

1. A speed reduction gear wherein a stationary internal gear and an external gear meshing with the internal gear are provided, and wherein a differential rotation due to difference in the number of teeth between the above said gears is transmitted to an output shaft characterized in that:
    A. the teeth of the internal gear are provided with a circular convex profile, and the teeth of the external gear are provided with a circular concave profile the radius of which is larger than that of the above said circular convex profile, in that:
    B. the meshing of the above said gears moves reciprocally between two points on the concave profile, and in that:
    C. the range defined by the above said two points does not include any edge of the concave profile.

2. A speed reduction gear according to claim 1 characterized in that the external gear is composed of a portion of casing of the speed change gear and a train of pins which are supported at their ends by the above said portion of the casing.

* * * * *